United States Statutory Invention Registration [19]

[11] Reg. Number: H502

Mabee, III, deceased et al.

[43] Published: Aug. 2, 1988

[54] HIGH SPEED PRECISION OPTICAL FIBER WINDING SYSTEM

[75] Inventors: Crawford D. Mabee, III, deceased, late of Union Grove, Ala., by Marilyn N. Mabee, executrix; Harold V. White; Paul B. Ruffin, both of Huntsville, Ala.; James C. Hung, Knoxville, Tenn.

[73] Assignee: The United States of America as represented by the Secretary of the Army, Washington, D.C.

[21] Appl. No.: 136,053

[22] Filed: Dec. 21, 1987

[51] Int. Cl.[4] ..... B65H 54/00; B65H 55/04; B65H 57/28

[52] U.S. Cl. ..... 242/18 R; 242/43 R; 242/158 R; 242/176; 242/177

*Primary Examiner*—Stephen C. Buczinski
*Assistant Examiner*—Linda J. Wallace
*Attorney, Agent, or Firm*—John C. Garvin, Jr.; Freddie M. Bush; Howard G. Garner, Jr.

[57] ABSTRACT

A process for terminating the winding of one fiber layer being wound on a bobbin in one direction and beginning the winding of another layer in the opposite direction wherein the bobbin is alternately rotated and traversed in small increments to obtain a transition from one layer to another which is free of gaps between adjacent turns in a layer and which does not slough off the bobbin.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4A
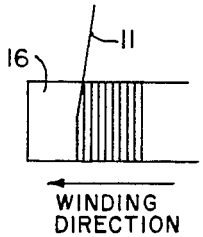
FIG. 4E
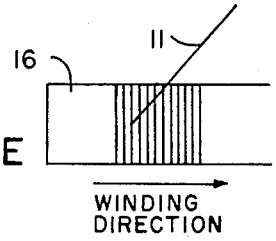
FIG. 4B
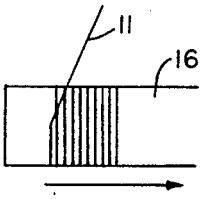
FIG. 4F
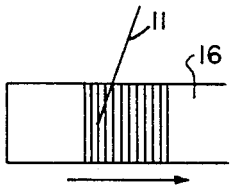
FIG. 4C
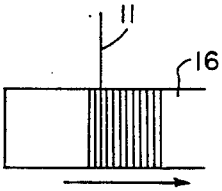
FIG. 4G
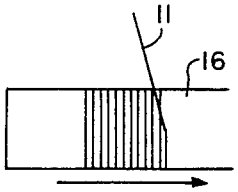
FIG. 4D
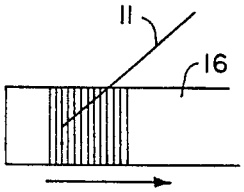
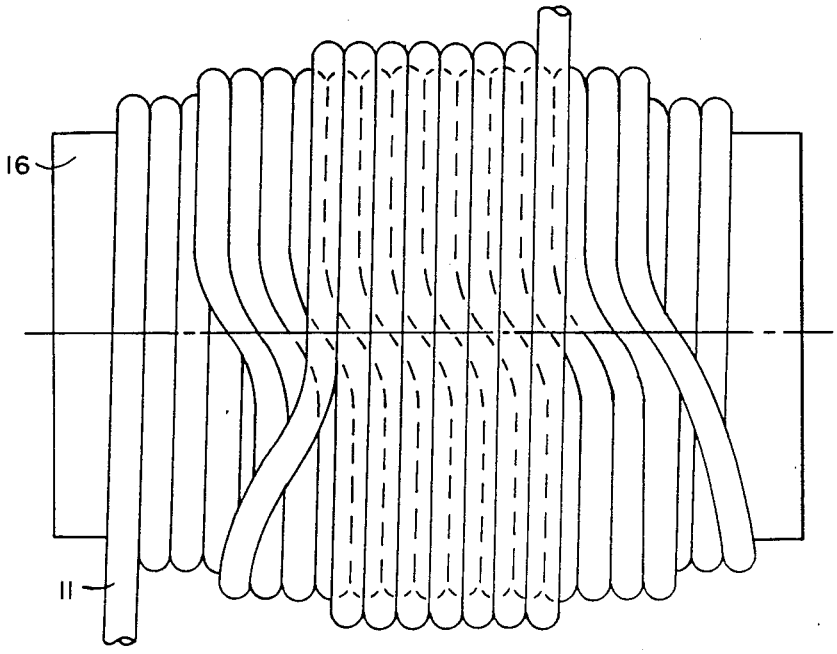
FIG. 5

HIGH SPEED PRECISION OPTICAL FIBER WINDING SYSTEM

DEDICATORY CLAUSE

The invention described herein may be manufactured, used, and licensed by or for the Government for governmental purposes without the payment to me of any royalties thereon.

BACKGROUND OF THE INVENTION

Optical fibers are used in certain missile guidance systems, information being transmitted back and forth from a control station through the optical fiber to the moving missile. The optical fiber is stored on a bobbin in the missile and is paid out as the missile travels toward the target. Because of the high rate of speed of the missile and the consequent high rate at which the fiber is pulled off the bobbin, the fiber must be very carefully wound onto the bobbin to avoid damage to the fiber as it is pulled off the bobbin. It is for this reason that very great care must be taken in winding optical fiber onto a bobbin which is to be used for the transmission of data between a control station and a moving missile.

Equipment has been developed for very precisely measuring the angle at which the fiber is wound onto the bobbin and for traversing the bobbin past an eyelet through which an optical fiber passes to obtain the very precise winding of a layer of fiber on the bobbin. However, a very real difficulty arises when the end of the layer of fiber being wound in one direction is reached and the direction of movement of the bobbin past the eyelet is reversed to wind another layer in the opposite direction. If the winding direction traversal is not done with great precision the end turns in the layer may slough off, resulting in uneven tension when the fiber is pulled from the bobbin. When the fiber is pulled off the bobbin at a very high rate of speed, uneven tension in the fiber can cause the fiber to break. Also, improper reversal of winding direction can result in gaps or spaces between adjacent turns of the fiber at the ends of the layer. A portion of a turn of the fiber layer in the next layer to be wound can slump into this gap and cause the fiber to be pulled off the bobbin at an uneven tension.

SUMMARY OF THE INVENTION

A process for terminating the winding of one fiber layer being wound on a bobbin in one direction and beginning the winding of another layer in the opposite direction, wherein the bobbin is mounted for rotation and for traversing back and forth past an eyelet through which the fiber is fed. The bobbin is rotated until the layer is formed on the bobbin to the desired point and then the bobbin is alternately traversed and rotated in small increments through several cycles to precisely begin the formation of the layer extending in the other direction on the bobbin.

BRIEF DESCRIPTION OF THE DRAWINGS

FIGS. 4*a* through 4*g* show in a schematic way the positioning of the bobbin and the various fiber lag and lead angles used in reversing the direction of winding at the end of a layer.

FIG. 5 is a greatly enlarged view showing the manner in which several layers of fiber winding are positioned when the process of this invention are used.

DESCRIPTION OF THE PREFERRED EMBODIMENT

Figure 1:
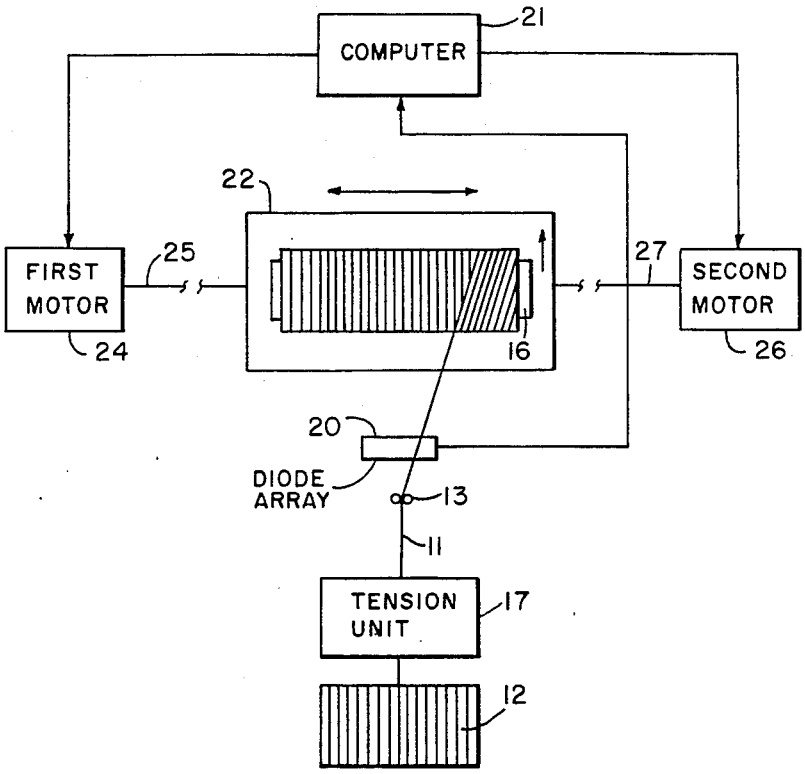
FIG. 1 is a schematic view of apparatus used in carrying out the process of this invention.

Referring now in detail to the drawings, there is known in FIG. 1 an optical fiber 11 being fed from a supply spool 12 through an eyelet 13 for takeup on a bobbin 16. The optical fiber, which has a diameter of about 0.25 millimeters, passes through a tension unit 17 of a conventional type which controls the tension in the span of the fiber between the supply spool 12 and the bobbin 16 to assure that the fiber is being wound onto the bobbin 16 at a substantially constant tension. Positioned between the eyelet 13 and the bobbin 16 is an array of photodiodes 20 (individual photodiodes not shown) over which the fiber 11 passes. Colimated light from a source (not shown) casts a shadow of the fiber onto the diode array. If the photodiodes are positioned on centers about equivalent to the diameter of fiber 11, then one of the photodiodes will be darkened by the shadow of fiber 11.

A computer 21 connected to the diode array 20 senses the output of the various diodes in the array 20 to precisely determine the angle at which the fiber 11 is being fed to the bobbin 16. Inasmuch as the photodiodes in the array 20 are very small and can be readily positioned on centers equivalent to the diameter of fiber 11, the computer 21 can, by sensing the particular photodiode which is darkened by the shadow of the fiber, determine precisely what the fiber feed angle is.

The bobbin 16 is mounted for rotation on a platform 22 which is mounted for traversing back and forth past the eyelet 13. A first motor 24, connected to the computer 21, is connected to the bobbin 16 by a shaft 25 to rotate the bobbin 16 for taking the fiber up on the bobbin. A second motor 26 connected to the platform 22 by a lead screw 27 serves to traverse the platform, and thus the bobbin, back and forth past the eyelet 13. This structure is conventional. Both motors are connected to and controlled by the computer 21.

Figure 2:
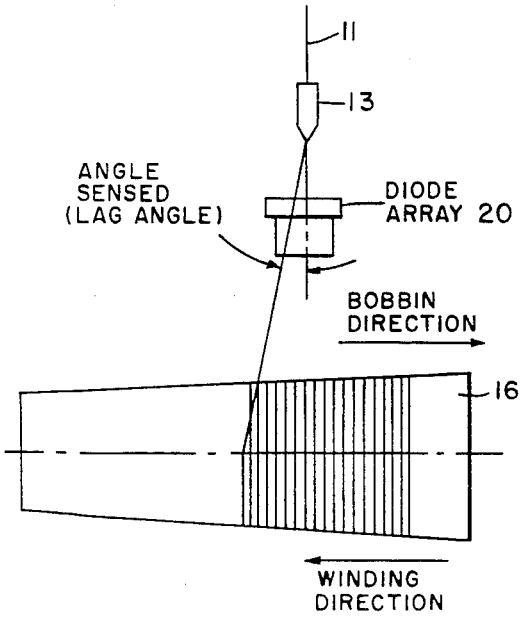
FIG. 2 is a schematic view showing the fiber being wound onto the bobbin at a lag or negative angle.
Figure 3:
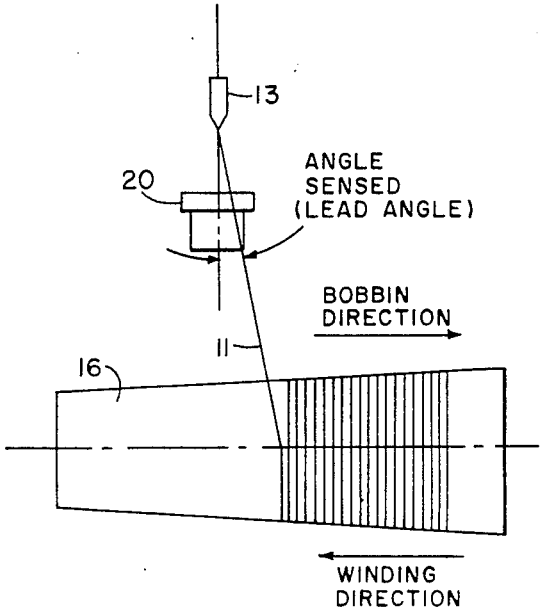
FIG. 3 is a schematic view showing the fiber being wound onto the bobbin at a lead or positive angle.

FIGS. 2 and 3 illustrate both lag (negative) and lead (positive) angles at which the fiber 11 can be fed onto the bobbin 16. The fiber 11 between the eyelet 13 and contact with the surface of the bobbin 16 lies in a plane which passes through the eyelet 13 and is tangent to the bobbin. The angle to be sensed is that angle, lying in the aforementioned plane, between the fiber and a line which passes through the eyelet 13 and is tangent to the bobbin.

In FIG. 2, where the angle sensed is a lag or negative angle, it will be noticed that, with respect to winding direction, the eyelet 13 lags behind the point at which the fiber first contacts the bobbin 16. In FIG. 3, where the angle sensed is a lead or positive angle, it will be noticed that, with respect to winding direction, the eyelet 13 leads the point at which the fiber 11 first contacts the bobbin 16. It should be understood that as a fiber layer is wound from one end of the bobbin to the other, a lag angle as illustrated in FIG. 2 is used.

FIGS. 4*a* through 4*g* represent, in sequence, the steps involved in carrying out the process of the present invention, these steps forming a precise transition of the winding of one layer in one direction to the winding of the next layer in the opposite direction. Each of the steps shown in FIGS. 4*a* through 4*g* is controlled by the computer 21 (FIG. 1), with the fiber feed angle being greatly exaggerated in these figures for purposes of illustration.

FIG. 4*a* shows the termination of the winding of a layer of fiber on the bobbin 16, with both rotation and traversing of the bobbin being stopped at this point. The winding of this layer has been done at a lag angle (negative angle) of about 0.075° to 0.095°. Preferably, this angle is about 0.085°.

FIG. 4*b* illustrates the next step in the process. Without rotation of the bobbin, the bobbin is traversed until the sensed angle is a lead angle (positive angle) of about 0.2 to 0.5 degrees, at which point the traversing of the bobbin is stopped. Preferably, this angle is about 0.35°.

In FIG. 4*c*, without traversing the bobbin 16, the bobbin is rotated until the sensed angle is substantially zero, at which time rotation of the bobbin is stopped.

In FIG. 4*d*, without rotation of the bobbin 16, the bobbin is traversed until the sensed angle is a lead angle of about 2 to 3 degrees, at which the time traversal of the bobbin is stopped. Preferably, this angle is about 2.5°.

In FIG. 4*e*, without traversal of the bobbin 16, the bobbin is rotated until the sensed angle is a lead angle of about 1.6 to 2.1 degrees, at which time rotation of the bobbin 16 is stopped. Preferably, this angle is about 1.8°.

In FIG. 4*f*, without rotation of the bobbin 16, the bobbin is traversed until the sensed angle is a lead angle of about 0.5 to 0.9 degrees, at which time traversal of the bobbin is stopped. Preferably, this angle is about 0.7°.

In FIG. 4*g*, without traversing the bobbin, the bobbin is rotated until the sensed angle is a lag angle of about 0.075 to 0.095 degrees, preferably about 0.085°.

This completes the reversal of the winding direction and the winding of the next layer is continued at the lag angle shown in FIG. 4*g*. When the next layer is completed the winding direction is reversed using the steps described above.

FIG. 5 is a greatly enlarged view showing several layers which have been wound using this process. There are no gaps in the ends of the layers and, because each turn lies in the groove formed by two adjacent turns in the next lower layer, turns at the ends of the layers are not likely to slough off. Also, this process prevents the formation of gaps or spaces between adjacent turns in the layers wound on the bobbin.

We claim:

1. A process for terminating the winding of one fiber layer being wound on a bobbin in one direction and beginning the winding of another layer in the opposite direction, comprising;

a. providing: a fiber supply, a bobbin onto which the filer is to be wound, a fiber guide positioned adjacent to the bobbin, means for rotating the bobbin, means for traversing the bobbin back and forth past the guide, means positioned between the guide and the bobbin for sensing the angle between the fiber and a line extending through the guide and tangent to the bobbin, and means connected to the sensing means for controlling the rotation and traversing means, b. rotating and traversing the bobbin to form said one layer to a desired point on the bobbin and then stopping the rotation and traversing of the bobbin to terminate the formation of said one layer, c. traversing the bobbin until the sensed angle is about +0.2 to +0.5 degrees, and then stopping said traversing, d. rotating the bobbin until the sensed angle is substantially zero and then stopping said rotating, e. traversing the bobbin until the sensed angle is about +2 to +3 degrees and then stopping said traversing, f. rotating the bobbin until the sensed angle is reduced to about +1.6 to +2.1 degrees and then stopping said rotating, g. traversing the bobbin until the sensed angle is reduced to about +0.5 to +0.9 degrees and then stopping said traversing, h. rotating the bobbin until the sensed angle is about −0.075 to −0.095 degrees and, i. winding said another layer while traversing the bobbin to maintain the sensed angle at about −0.075 to −0.095 degrees.

2. The process for claim 1 wherein the filament diameter is about 0.25 milimeters, the sensed angle in step c is about +0.3 degrees, the sensed angle in step e is about +2.5 degrees, the sensed angle in step f is about +1.9 degrees, the sensed angle in step g is about +0.7 degrees, and the sensed angle in steps h and i are each about −0.085 degrees.

* * * * *